May 20, 1930.   J. A. WHITE   1,759,724
FLUSHING VALVE
Filed June 16, 1928   2 Sheets-Sheet 1

Inventor:
Joseph A. White
by his Attorneys

May 20, 1930.　　　　J. A. WHITE　　　　1,759,724
FLUSHING VALVE
Filed June 16, 1928　　　2 Sheets-Sheet 2
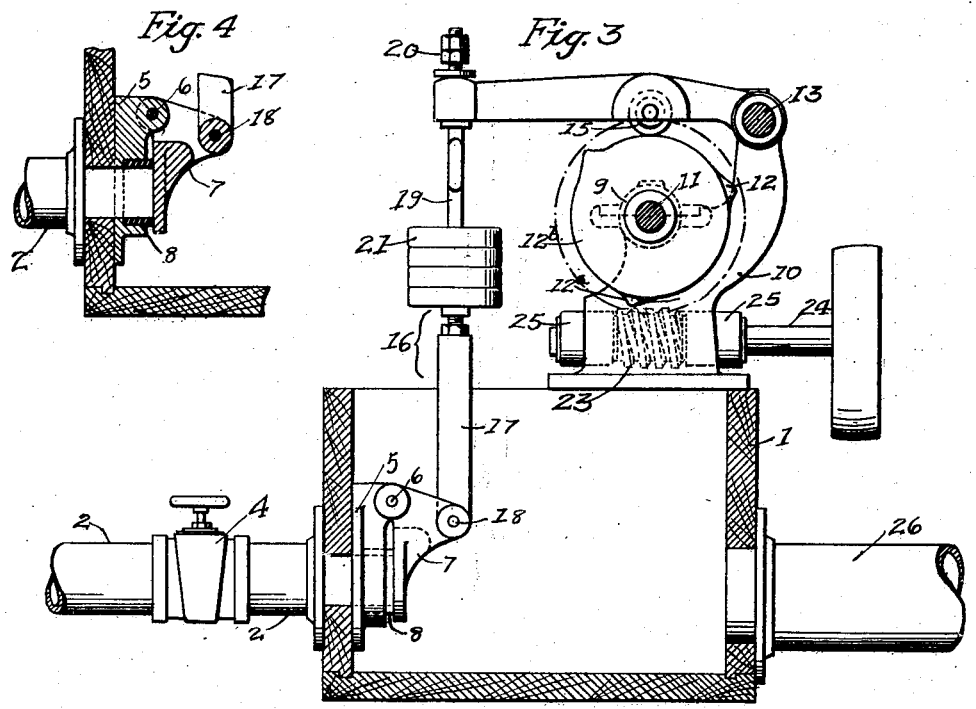
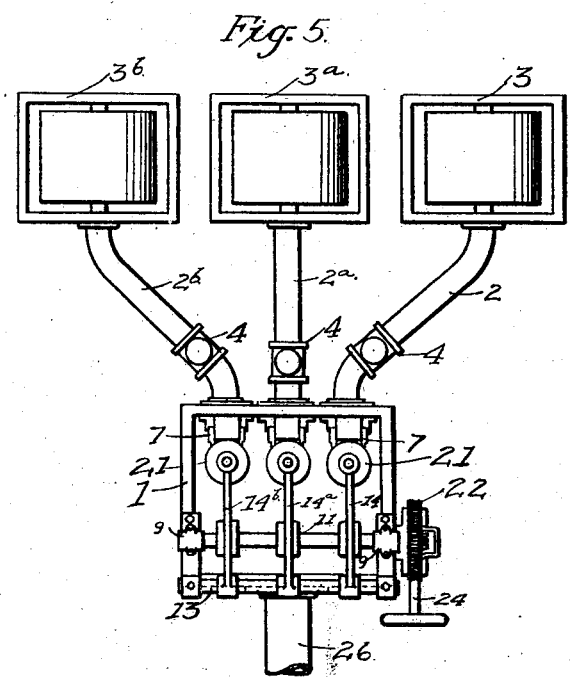
Inventor
Joseph A. White
by his Attorneys Patented May 20, 1930

1,759,724

UNITED STATES PATENT OFFICE

JOSEPH A. WHITE, OF MELROSE PARK, PENNSYLVANIA, ASSIGNOR TO THE MOORE & WHITE COMPANY, OF PHILADELPHIA, PENNSYLVANIA, A COMPANY OF PENNSYLVANIA

FLUSHING VALVE

Application filed June 16, 1928. Serial No. 285,923.

One object of my invention is to provide a flushing valve mechanism for a vat of a paper-making machine which will be actuated at regular intervals.

A further object of my invention is to provide a flushing valve mechanism for one or more vats, so that the valves can be flushed alternately at regular intervals.

A still further object of my invention is to provide means for quickly removing the tailings of a paper-making machine with a minimum amount of waste of good material.

The invention also relates to means for balancing the valve, and the provision of a single valve box for the series of valves.

In the accompanying drawings:

Fig. 3 is a sectional elevation on the line 3—3, Fig. 1;

Fig. 4 is a sectional view of one of the valves on the line 4—4, Fig. 1; and

Fig. 5 is a diagrammatic view showing a series of paper-making machines of the cylinder type connected to my improved flushing valve.

Figure 1:
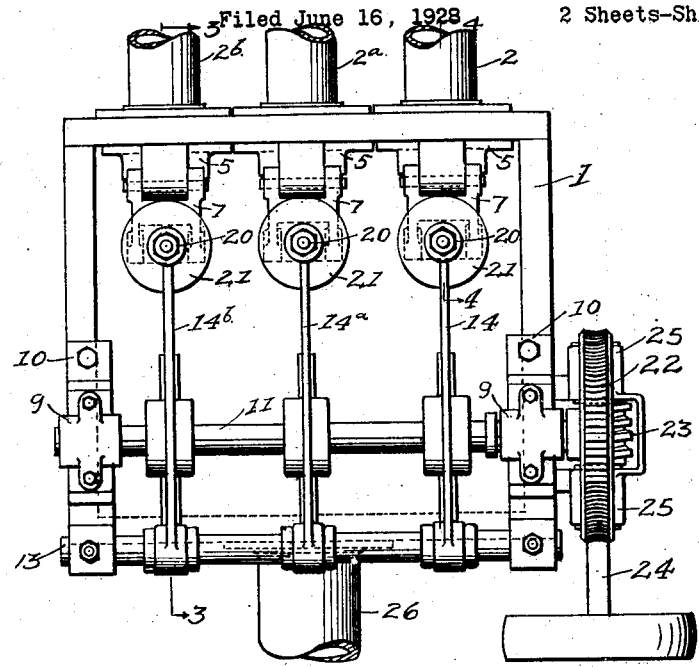
Fig. 1 is a plan view of my improved flushing valve.
Figure 2:
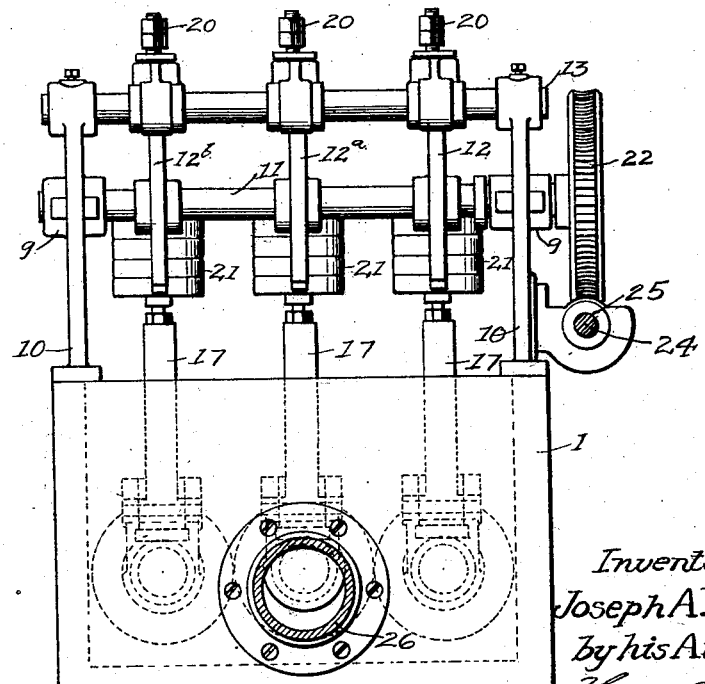
Fig. 2 is a view in elevation showing the discharge pipe in section.

The valve box or tank 1 is rectangular in shape in the present instance, and three pipes 2, 2ª and 2ᵇ extend from independent paper-making machines 3, 3ª and 3ᵇ, Fig. 5. These machines are of the cylinder type, and the pipes are connected to the bottoms of the vats and take the place of the usual waste pipes which have discharge valves directly under the vats.

Each pipe is provided with a cut-off valve 4 located preferably near the box, so that any one of the pipes can be closed when repairs to a particular machine are necessary. Secured to the inner side of the valve box 1 are three valve plates 5, to which are pivoted at 6 valves 7 which close against cylindrical seats 8 of rubber or other suitable material.

Mounted in bearings 9—9 on standards 10—10 is a shaft 11 on which are three cams 12, in the present instance having their high points so spaced that they will act at regular intervals.

Pivotally mounted on a bar 13, carried by one of the standards 10, are arms 14, 14ª and 14ᵇ. Each arm has a roller 15 which rests upon one of the cams, as shown in Fig. 3. The arms are connected respectively to the several valves 7 by a two-part rod 16. The lower part 17 of each rod has a head which fits between two lugs on one of the valves 7 and is connected to the valve by a pivot pin 18.

The upper part 19 of the rod 16 is screwed into the lower part 17, and on this part 19 is a jamb-nut. The upper end of each rod 16 extends through an opening in the outer end of an arm and can be adjusted by nuts 20.

On each rod 16 are weights 21 which tend to over-balance the pressure against the valves, so that, while they can be readily opened by the cams, they will normally remain closed.

On one end of the valve shaft 11 is a worm-wheel 22 which meshes with a worm 23 on a driven shaft 24 having its bearings in a bracket 25 on one of the standards 10. This power shaft can be driven in any manner desired.

A discharge pipe 26 is connected to the box 1 and may extend to an auxiliary pump so that the tailing can be re-screened if desired.

The cam shaft is driven at a slow speed and the valves are opened at regular intervals so as to quickly flush the tanks of the paper-making machines with a minimum amount of waste of good material. By flushing the vats at equal intervals of time, irregular discharges of the material are avoided.

While my invention has been described in connection with paper-making machines of the rotary screen type, it may be used for other purposes if desired.

The drawings illustrate a flushing tank having three inlets, but it will be understood that the tank may have a single inlet or more than three if desired.

I claim:—

1. The combination in a flushing valve mechanism, of a valve box; a series of inlet pipes communicating with the box; a valve for each inlet pipe; and means for operating the valves so that they will be operated consecutively at regular intervals of time.

2. The combination in a flushing valve mechanism, of a box; a series of inlet pipes communicating with the box; a valve for each inlet pipe; a shaft; and a series of cams on the shaft arranged to actuate the valves consecutively at regular intervals of time.

3. The combination in a flushing valve mechanism, of a box; an inlet pipe; a valve plate; a flexible seat on said plate; a valve pivoted to the plate and arranged to close against the seat; a shaft; a cam on the shaft; and a pivoted arm connected to the valve.

4. The combination in a flushing valve mechanism, of a box; an inlet pipe communicating with the box; a valve seat at the pipe; a valve arranged to close against the seat; a shaft; a cam on the shaft; a pivoted arm bearing against the cam; and a rod connecting the arm with the valve.

5. The combination in a flushing valve mechanism, of a box; an inlet pipe communicating with the box; a valve seat at the pipe; a valve arranged to close against the seat; a shaft; a cam on the shaft; a pivoted arm bearing against the cam; a rod connecting the arm with the valves; and a counter-balance weight tending to hold the valve closed against pressure in the pipe.

6. The combination of a box; a series of pipes leading into the box; a valve at each pipe for closing the same; a cam shaft; a series of cams thereon timed to act consecutively; an arm for each cam; a rod connecting each arm with a valve; a counterweight on each rod; and an outlet for the box.

7. The combination of a series of paper-making machines; a flushing valve box; pipes for independently connecting the bottom of each paper-making machine with the box; a valve in the box for each pipe; a cam shaft; a series of cams on the shaft; and means actuated by the cams for controlling the valves, the cams being set so that the valves will be operated consecutively.

JOSEPH A. WHITE.